Nov. 27, 1928.
G. F. WIKLE
1,693,419
TIRE BUILDING MACHINE
Filed May 13, 1925   3 Sheets-Sheet 1
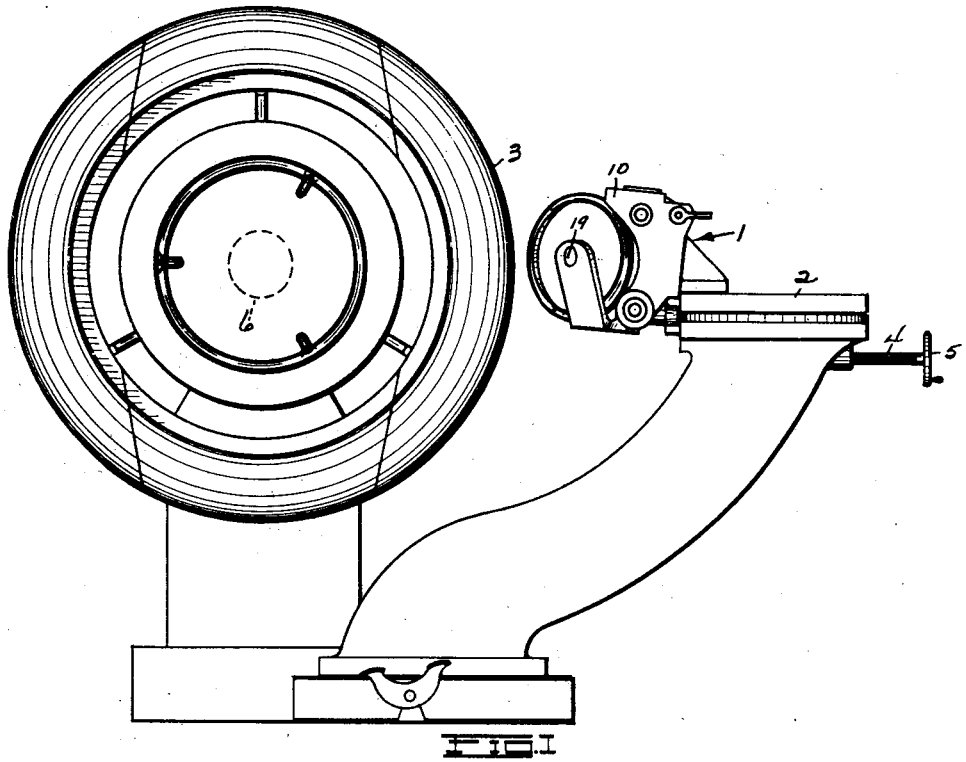
FIG.I
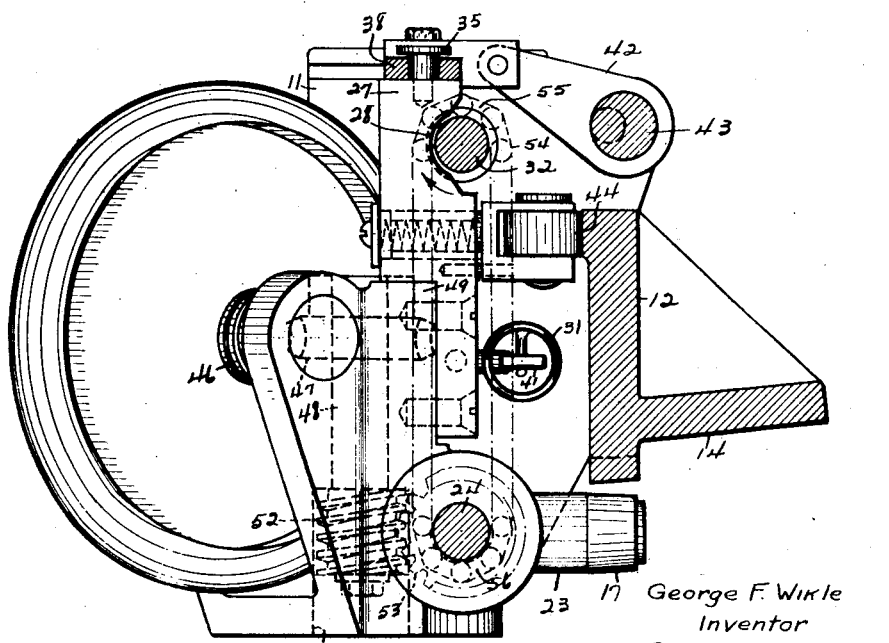
FIG.III
George F. Wikle
Inventor
By
Attorney Nov. 27, 1928.　　　　　　　　　　　　　　　　1,693,419
G. F. WIKLE
TIRE BUILDING MACHINE
Filed May 13, 1925　　　　3 Sheets-Sheet 2
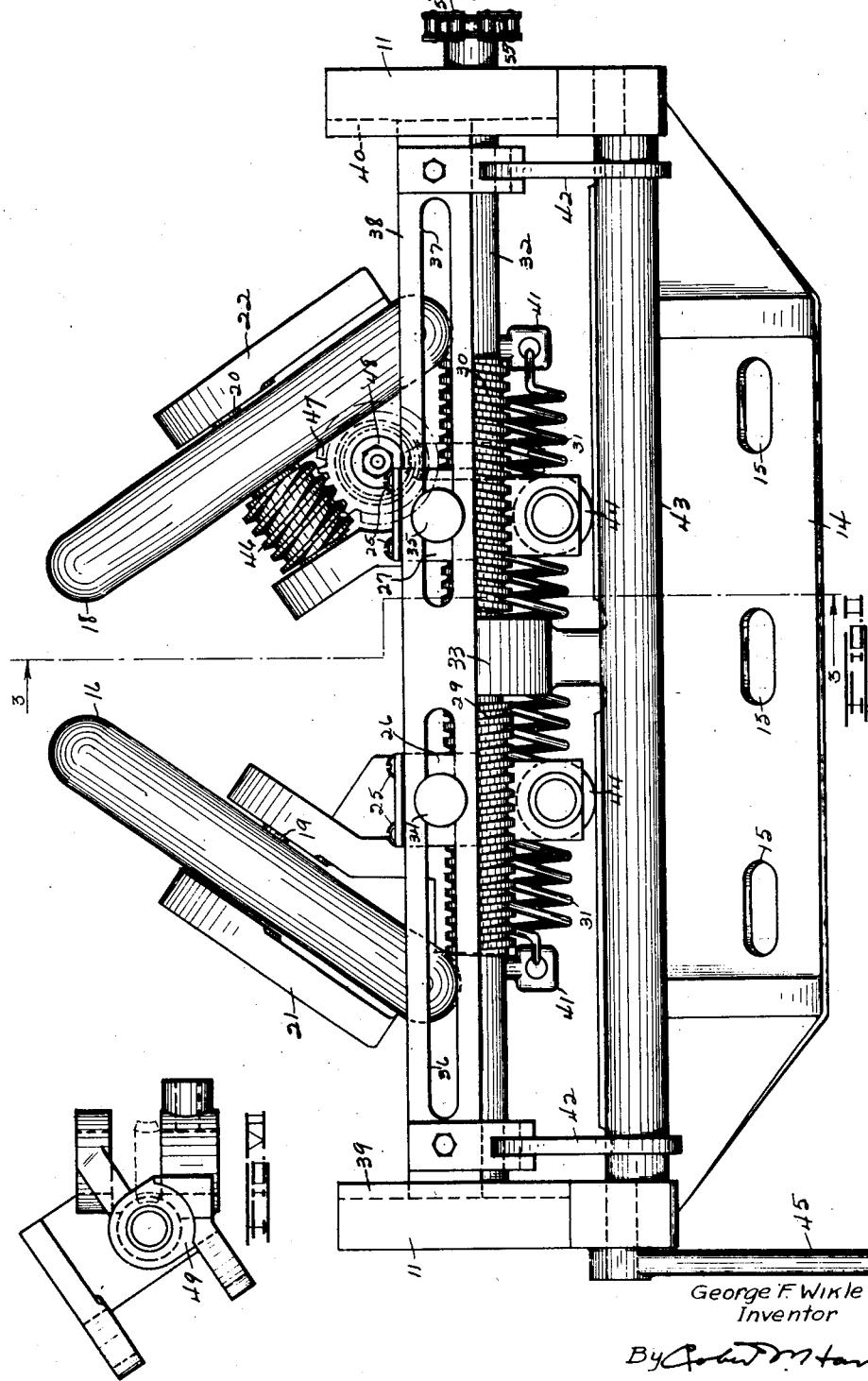
George F. Wikle
Inventor
By
Attorney Nov. 27, 1928.
G. F. WIKLE
1,693,419
TIRE BUILDING MACHINE
Filed May 13, 1925   3 Sheets-Sheet 3
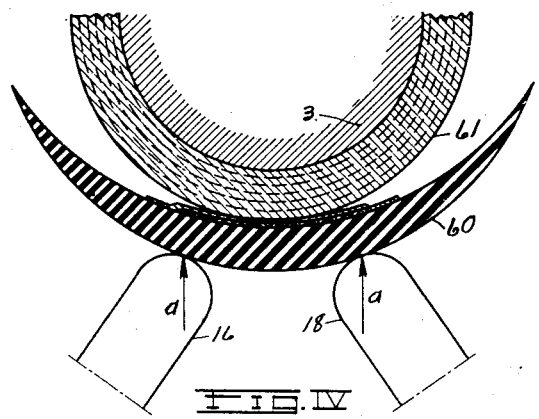
FIG. IV
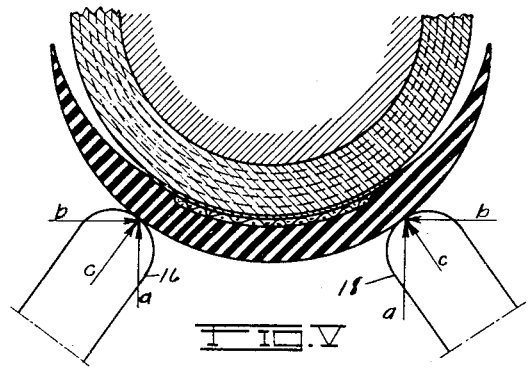
FIG. V
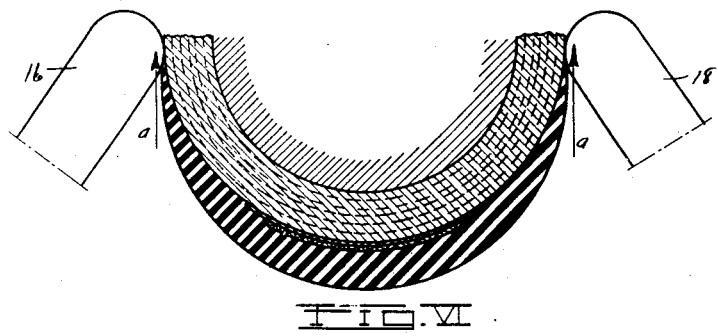
FIG. VI
George F. Wikle
Inventor
By *[signature]*
Attorney Patented Nov. 27, 1928.

1,693,419

UNITED STATES PATENT OFFICE.

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-BUILDING MACHINE.

Application filed May 13, 1925. Serial No. 30,010.

My invention relates to tire building machines and more particularly to means for securing and shaping the tread to the carcass.

In the manufacture of tire casings it is customary to build up the tire carcass by applying a plurality of plies of rubberized fabric, either square woven or cord fabric to a core of the proper shape, a strip of tread rubber cut to the proper length and skived at the ends is then centered around the circumference of the tire carcass and conformed to the cross-section of the carcass in adhering contact therewith. The tread strip is of substantial thickness and may include the conventional breaker and cushion strips. To assure a proper bonding of the tread to the carcass at vulcanization it is essential that the raw tread be uniformly and securely applied to the carcass and that no air pockets be left between the latter and the tread. Where the tread strips are of relatively great thickness and weight, as in truck tires, the application of the tread in respect to the essentials mentioned presents particular difficulties and in the past it has been customary to pound the tread into conformity with the carcass with a wooden mallet.

It is the principal object of my invention to provide means for mechanically applying the tread to the carcass with a resulting greater uniformity of application and a more complete bond between the tread and carcass. Further objects are to increase the speed of application and decrease the labor involved in the operation. Other and further objects will be apparent from the following description and claims.

In the accompanying drawings which illustrate one embodiment of my device,

Figure 1 is a side view illustrating my device in connection with a conventional building core, Figure 2 is a plan view of my device, Figure 3 is a section, on line 3—3 of Figure 2, and Figures 4, 5 and 6 illustrate diagrammatically the operation of the device.

Figure 7 illustrates a bearing.

Referring to Figure 1 my tread applying mechanism indicated generally at 1 is shown supported on a sliding table 2 adapted to be moved toward the building core 3 by means of screw 4 operated by hand wheel 5. Core 3 is removably mounted on power driven shaft 6. The mounting of the core and the means for forcing the tread applying device against the core may be of any suitable form and as their specific structure forms no part of my present invention, further description thereof is deemed unnecessary. A suitable example of both is disclosed in my co-pending application 697,200, filed March 6, 1924.

The frame supporting my tread applying mechanism is indicated at 10 and comprises a U-shaped member having sides 11 and back 12, the latter being provided with a horizontal extension 14. The frame is secured to table 2 by means of bolts passing through apertures 15 formed in the extension 14.

The tread applying instrumentalities comprise two rollers 16 and 18, positioned at a fixed angle with respect to the plane of the building core, and mounted on shafts 19 and 20 rotating in U-shaped bearing blocks 21 and 22 respectively. These bearing blocks are pivotally mounted (see Figure 3) on and slidable along a shaft 24 mounted in bearings formed in ends 11 of the frame, the forward swing of the bearing blocks being limited by rolls 17 rotatably mounted in bosses 23 formed integral with blocks 21 and 22, engaging the lower edge of rear frame 12. Secured to bearing blocks 21 and 22 as by screws 25 are members 26 and 27 provided with threaded surfaces 28 adapted to engage worms 29 and 30 formed on a shaft 32 mounted in the side frames 11 and a central bearing 33 formed integral with the back 12. As is clear from Figure 2 the worms 29 and 30 are opposite in pitch. Members 26 and 27 are provided with headed members 34 and 35 slidable in slots 36 and 37 formed in bar 38 slidable in guideways 39 and 40 formed in the side frames 11. Bar 38 is adapted to be reciprocated in guideways 39 and 40 to move members 26 and 27 into and out of engagement with worms 29 and 30, by links 42 pivoted to bar 38 and mounted at the other end on shaft 43 eccentrically mounted in the end frame 11. Shaft 43 is conveniently operated by a lever 45 secured to one end. As will be evident, when the threaded surfaces of members 26 and 27 are in engagement with worms 29 and 30, rotation of the latter in a clockwise direction as viewed in Figure 3 will separate rolls 16 and 18. When rolls 16 and 18 reach the optional extent of such movement they are returned to their original position by spring 31 stretched between lugs 41 secured to members 26 and 27 upon release of the latter from engagement with worms 29 and 30. Spring pressed guide rolls 44 mounted in members 26 and 27 engage the rear frame member 12 and partially relieve the worms 29 and 30 of thrust of the rolls 16 and 18 against the core as later described. Rotation of shaft 32 is secured in the following manner. Shaft 20 of roll 18 is provided with a worm 46 meshing with worm gear 47 secured to the upper end of a vertical shaft 48 mounted in bearings 49 and 50 of bearing block 22, see Figures 3 and 7. The lower end of shaft 48 is provided with a worm 52 meshing with worm gear 53 splined on shaft 24 and slidable thereon. Shaft 32 is driven from shaft 24 by a sprocket chain 54 passing over sprockets 55 and 56 respectively mounted on said shafts.

The operation is as follows: With the rolls 16 and 18 at the inward extent of their movement and members 26 and 27 locked in engagement with their driving worms as shown in Figure 3 the rolls 16 and 18 are brought into contact with and forced against the tread 60 positioned on carcass 61 supported on core 3, the latter being in rotation. Rolls 16 and 18 are frictionally rotated by their contact with the core and roll 18 through worm 46 and sprocket 56 and the intermediate gearing rotates shaft 32 to gradually separate wheels 16 and 18 and the core 3 is applied and maintained by the operator through operation of hand wheel 5.

As shown in Figure 4, at the beginning of the operation the thrust is substantially radial of the core as shown by arrows *a—a*. As the action proceeds, the wedging action of the core as it enters between the receding rolls 16 and 18 introduces a lateral thrust indicated at *b—b* which is taken up by worms 29 and 30, the resultant thrust being substantially perpendicular to the surface of the core and carcass as at *c—c* of Figure 5. The tread 60 is thus directly, uniformly and progressively applied to the circumference and shoulders of the carcass. As the rolls advance down the sides of the core the wedging action of the latter diminishes until at the point where the thin edges of the tread are applied to the sidewall of the tire the thrust is again mainly, though not wholly, parallel to the plane of the core, and the edges of the tread are therefore stretched and "wiped" smoothly against the sidewall. This last phase of the operation is shown in Figure VI.

Having described one embodiment of my invention, I claim:

1. A device of the character described comprising a pair of rolls adapted to be forced against the tread portion of a tire casing and means driven by the contact of said rolls and the casing to positively separate said rolls at a uniform rate.

2. A device of the character described comprising a pair of rolls adapted to be forced against the tread portion of a tire casing, said rolls being mounted for relative movement with respect to each other and adapted to be rotated by contact with the tread portion of the casing and means driven by said rolls to positively separate the latter at a uniform rate.

3. A device of the character described comprising angularly positioned presser rolls adapted to be normally positioned against the center of the tread element of a tire casing, said rolls being mounted for relative movement with respect to each other and adapted to be rotated by contact with the tread portion of the casing and means driven by the rotation of one of said rolls to positively separate said rolls at a uniform rate.

4. A device of the character described comprising angularly positioned presser rolls mounted for transverse movement with respect to each other, means driven by rotation of said rolls to positively separate the latter and means to automatically return said rolls to normal position at a predetermined point of separation.

5. A device of the character described comprising a shaft, bearing members slidably and pivotally mounted on said shaft, rolls rotatably mounted in said bearing members, driving connections between one of said rolls and said shaft, a second shaft, driving connections between the latter and said first named shaft, and means releasably connecting said bearing members and said second named shaft to move said bearing members in opposite directions along said first named shaft.

6. A device of the character described comprising a frame, a shaft journaled in the frame, bearing members slidably and pivotally mounted on said shaft, rolls rotatably mounted in said bearing members, a gear splined on said shaft, driving connections between said gear and one of said rolls, a second shaft, means to drive the latter from said first named shaft, opposed worms formed on said second shaft, threaded members secured to said bearing members, means to bring said threaded members into driven relation with said worms to thereby move said bearing members in opposite directions along said first named shaft and means upon release of said threaded members to return the bearing members to original position.

7. A device of the character described comprising angularly positioned presser rolls mounted for transverse movement with respect to each other, means driven by rotation of at least one of said rolls to positively separate the rolls and means to return said rolls to normal position.

8. A device of the character described comprising presser rolls mounted for transverse movement with respect to each other, a threaded member and means releasably connecting said rolls to said member to separate said rolls by and through rotation of the latter.

In testimony whereof I have signed my name to the above specification.

GEORGE F. WIKLE.